US008064109B2

(12) United States Patent
Misu

(10) Patent No.: US 8,064,109 B2
(45) Date of Patent: Nov. 22, 2011

(54) IMAGE READER AND IMAGE FORMING APPARATUS

(75) Inventor: Susumu Misu, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 876 days.

(21) Appl. No.: 12/054,748

(22) Filed: Mar. 25, 2008

(65) Prior Publication Data

US 2008/0239414 A1 Oct. 2, 2008

(30) Foreign Application Priority Data

Mar. 26, 2007 (JP) ................................ 2007-079272

(51) Int. Cl.
*H04N 1/04* (2006.01)
(52) U.S. Cl. ......... 358/496; 358/497; 358/498; 358/474
(58) Field of Classification Search .................. 358/496, 358/497, 498, 474, 488
See application file for complete search history.

(56) References Cited

U.S. PATENT DOCUMENTS

| 5,124,810 A | 6/1992 | Seto | |
|---|---|---|---|
| 7,755,812 B2 * | 7/2010 | Oshida et al. | 358/496 |

FOREIGN PATENT DOCUMENTS

| JP | 02-311083 | 12/1990 |
|---|---|---|
| JP | 04-032358 | 2/1992 |
| JP | 07-319229 | 12/1995 |
| JP | 08-237445 | * 9/1996 |
| JP | 10-056539 | 2/1998 |
| JP | 10-155088 | 6/1998 |
| JP | 2000-232562 | 8/2000 |
| JP | 2001-036695 | * 2/2001 |
| JP | 2001-066714 | 3/2001 |
| JP | 2005-354714 | 12/2005 |
| JP | 2006-117382 | 5/2006 |

OTHER PUBLICATIONS

Office Action received for corresponding Japanese Application No. 2007-079272 mailed Feb. 10, 2009.

* cited by examiner

*Primary Examiner* — Houshang Safaipour
(74) *Attorney, Agent, or Firm* — Banner & Witcoff, Ltd

(57) ABSTRACT

An image reader and an image forming apparatus are provided. The image reader includes a stationary document scanning device; a moving document scanning device; a scan window; a document cover covering the scan window and comprising an opening located at a position facing the scan window; a document feeding mechanism which is disposed at the document cover and feeds a document through the opening in the document cover and onto the scan window when the document is to be scanned by the moving document scanning device; an image pickup device configured to read an image from the scan window; and a controller which detects edges of the stationary document based on image data read by the image pickup device, and performs an image data defining operation to determine image data, which is included within the detected edges of the document, as exact image data.

9 Claims, 15 Drawing Sheets

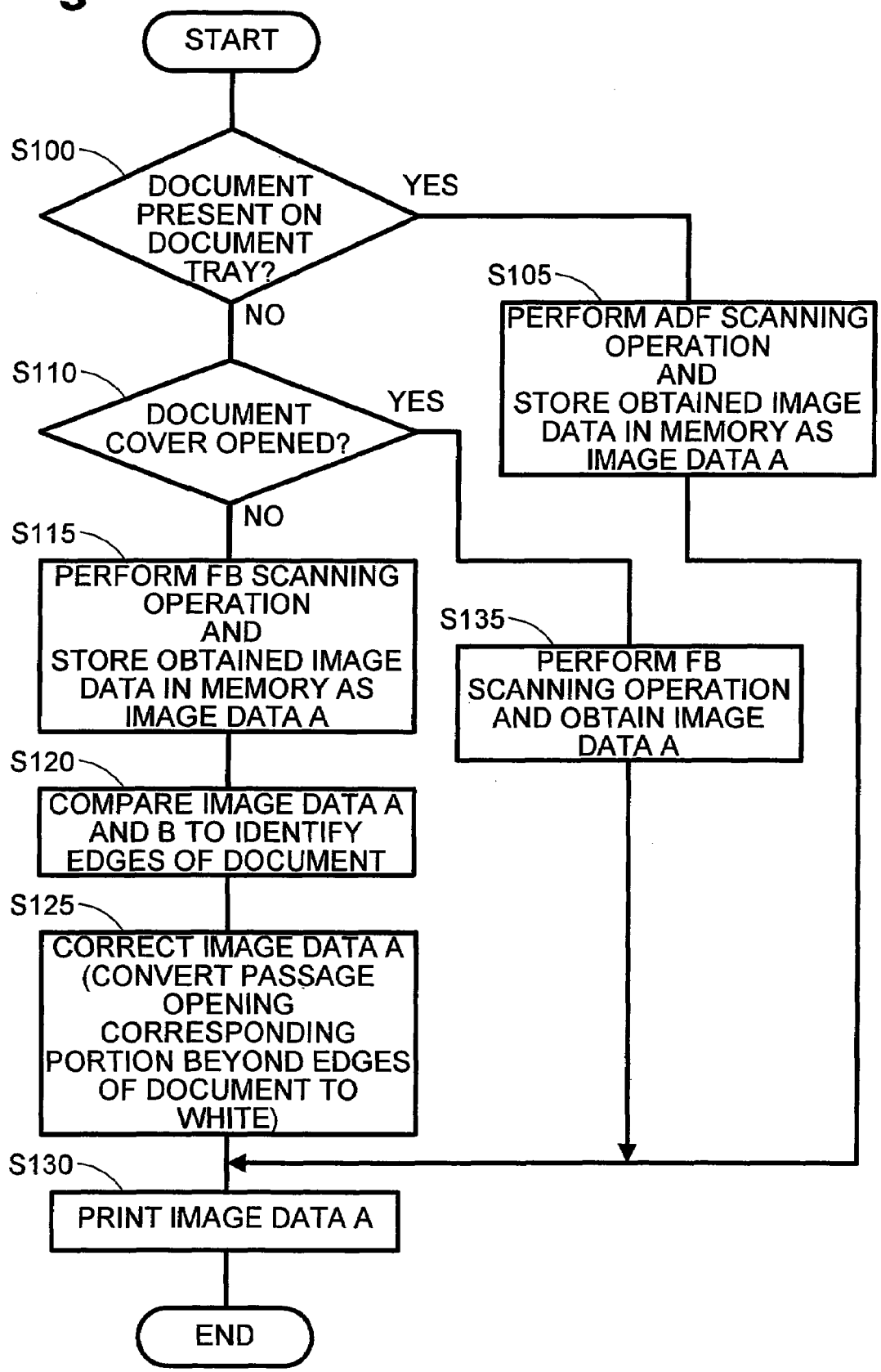

IMAGE DATA B

IMAGE DATA A

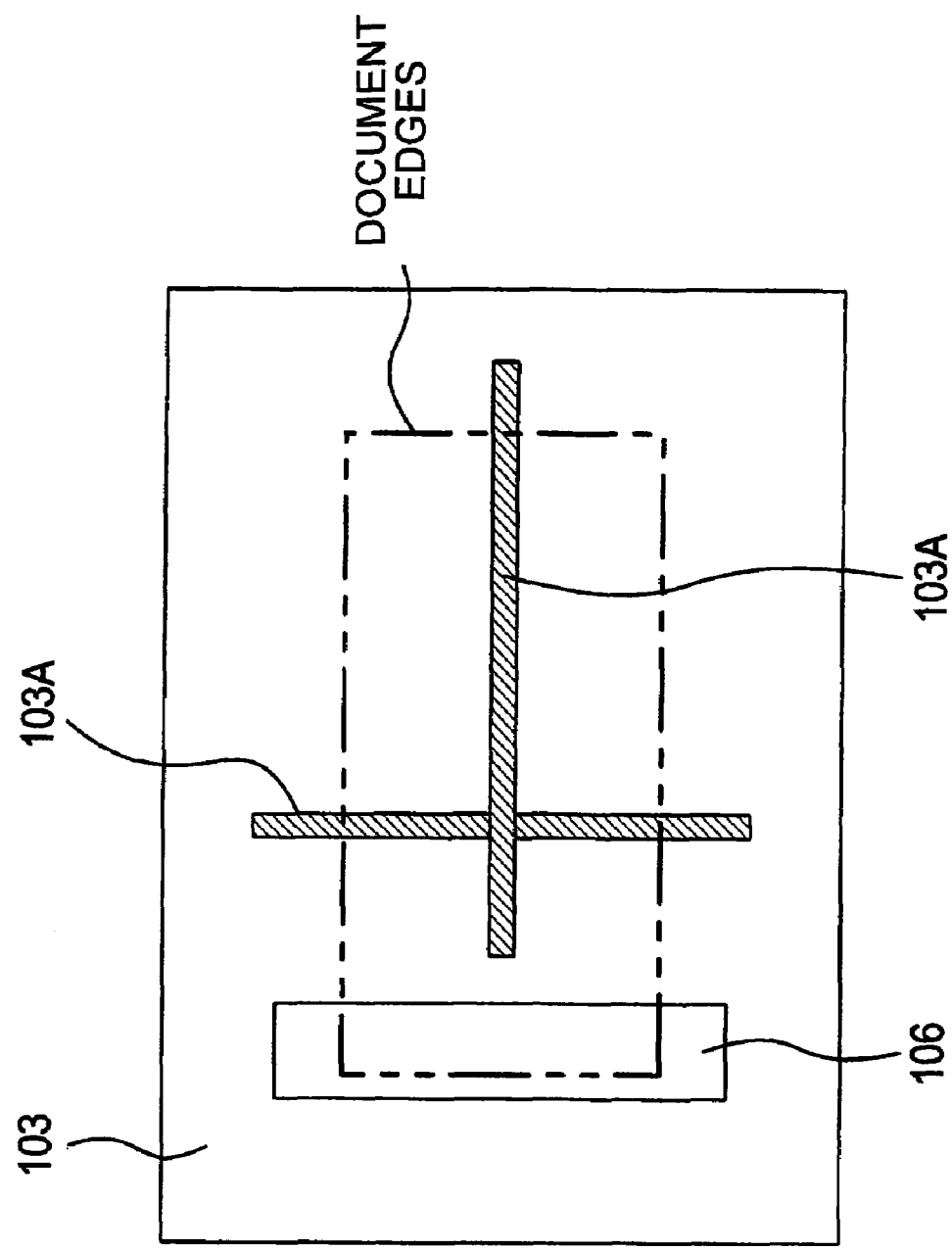

IMAGE READER AND IMAGE FORMING APPARATUS

CROSS REFERENCE TO RELATED APPLICATION

This application claims priority from Japanese Patent Application No. 2007-079272, filed on Mar. 26, 2007, the entire subject matter of which is incorporated herein by reference.

FIELD OF THE APPLICATION

Apparatuses consistent with the present invention relate to an image reader and an image forming apparatus.

BACKGROUND

Related art image readers have a stationary document scanning function (e.g. a flatbed scanning function) and a moving document scanning function (e.g. an automatic document feeder (ADF) scanning function). The stationary document scanning function reads an image from a stationary document placed on a scan window. The moving document scanning function reads an image from a moving document automatically fed by a document feeding mechanism such as the ADF.

The related art image reader may include two separate scan windows, one of which is to be used to scan a stationary document placed thereon by the stationary document scanning function and the other of which is to be used to scan a moving document by the moving document scanning function. The scan windows are disposed side by side in the image reader in a width direction (e.g. a right-left direction) of the image reader. By using this structure, the related art image reader can perform both the stationary document scanning function and the moving document scanning function.

SUMMARY

However, the above-described related art image reader has a disadvantage in that the structure of the related art image reader increases the size of the image reader in the width direction because the scan windows are arranged next to each other in the width direction.

Thus, in order to address this problem, a related art image reader which includes an integrated scan window has been proposed. In this related art image reader, the scan window for the stationary document and the scan window for the moving document are integrated to provide a single scan window to be commonly used to scan both a stationary document and a moving document. In this configuration, a scan window for the moving document scanning function is provided in a portion of a scan window for the stationary document scanning function.

However, this related art image reader also has a number of disadvantages.

A separate scan window intended for the moving document scanning function is omitted from the image reader, and the image reader includes a scan window for the stationary document scanning function, a part of which also has the moving document scanning function. That is, a part of the scan window used for the stationary document scanning function is used both in cases where a stationary document is read by the stationary document scanning function and in cases where a moving document is read by the moving document scanning function.

The image reader further includes a document conveying mechanism and a passage opening. The document conveying mechanism is configured to automatically convey a document to the scan window, and the passage opening provides an opening through which a document fed by the document conveying mechanism passes. In this structure, the image reader is configured such that the passage opening inevitably faces the scan window.

However, this configuration causes a disadvantage in that the light reflectivity at the passage opening is relatively low due to the light entering the scan window from the passage opening. Thus, a portion, corresponding to the passage opening, of an image read from a stationary document, may become darker than the original image of the document when a document scanning operation is performed by the stationary document scanning function. This problem is exacerbated if a document scanning operation is performed while there is an area on the scan window where there is document present between the passage opening and an image pickup device. For example, if a document which is smaller in size than the scan window is read, image data obtained by the document scanning operation may contain a shaded portion.

Aspects of the present invention address the above disadvantages and other disadvantages not described above. However, the present invention is not required to overcome the disadvantages described above, and thus, an aspect of the present invention may not overcome any of the problems described above.

It is an aspect of the present invention to provide an image reader having a stationary document scanning function and a moving document scanning function, wherein incorporation of a shaded portion in an image read from a stationary document is minimized and the image reader is reduced in size.

According to one aspect of the invention, there is provided an image reader that includes a stationary document scanning device which is configured to scan a stationary document; a moving document scanning device which is configured to scan a moving document; a scan window which is configured to support the stationary document; a document cover which is configured to be displaced with respect to the scan window and to cover the scan window, the document cover comprising an opening located at a position facing the scan window when the document cover covers the scan window; a document feeding mechanism which is disposed at the document cover and is configured to feed the moving document through the opening in the document cover and onto the scan window when the moving document is to be scanned by the moving document scanning device; an image pickup device which is disposed on an opposite side of the scan window from the document cover and is configured to read an image from the stationary document or the moving document; and a controller. The controller is configured to detect edges of the stationary document based on image data read by the image pickup device when an image reading operation is performed by the stationary document scanning device, and perform an image data defining operation to determine image data, which is included within the detected edges of the stationary document, as exact image data read by the stationary document scanning device when the image reading operation is performed by the stationary document scanning device.

According to another aspect of the present invention, there is provided an image forming apparatus. The image forming apparatus includes an image reader and an image forming unit disposed below the image reader. The image reader includes a stationary document scanning device which is configured to scan a stationary document; a moving document scanning device which is configured to scan a moving document; a scan window which is configured to support the stationary document; a document cover which is configured to be displaced with respect to the scan window and to cover the scan window, the document cover comprising an opening located at a position facing the scan window when the document cover covers the scan window; a document feeding mechanism which is disposed at the document cover and is configured to feed the moving document through the opening and onto the scan window when the moving document is to be scanned by the moving document scanning device; an image pickup device which is disposed on an opposite side of the scan window from the document cover and is configured to read an image from the stationary document or the moving document; and a controller. The controller is configured to detect edges of the stationary document based on image data read by the image pickup device when an image reading operation is performed by the stationary document scanning device, and perform an image data defining operation to determine image data, which is included within the detected edges of the stationary document, as exact image data read by the stationary document scanning device when the image reading operation is performed by the stationary document scanning device.

BRIEF DESCRIPTION OF THE DRAWINGS

Illustrative aspects will be described in detail with reference to the following figures in which like elements are labeled with like numbers and in which:

FIG. 5 is a flowchart of a control process that is to be performed when a start switch for activating a copying function is pressed according to the first illustrative aspect of the present invention;

FIG. 15 is an explanatory diagram illustrating a variation of the seventh illustrative aspect of the present invention.

DETAILED DESCRIPTION

Illustrative aspects of the present invention will now be described in detail with reference to the accompanying drawings. In the description, the present inventive concept is applied to an image forming apparatus including an image reader (e.g. a scanner) and an electrophotographic image forming unit (e.g. a laser printer). In the description that follows, an orientation of the image forming apparatus is defined by direction arrows indicated in FIG. 1.

Figure 1:
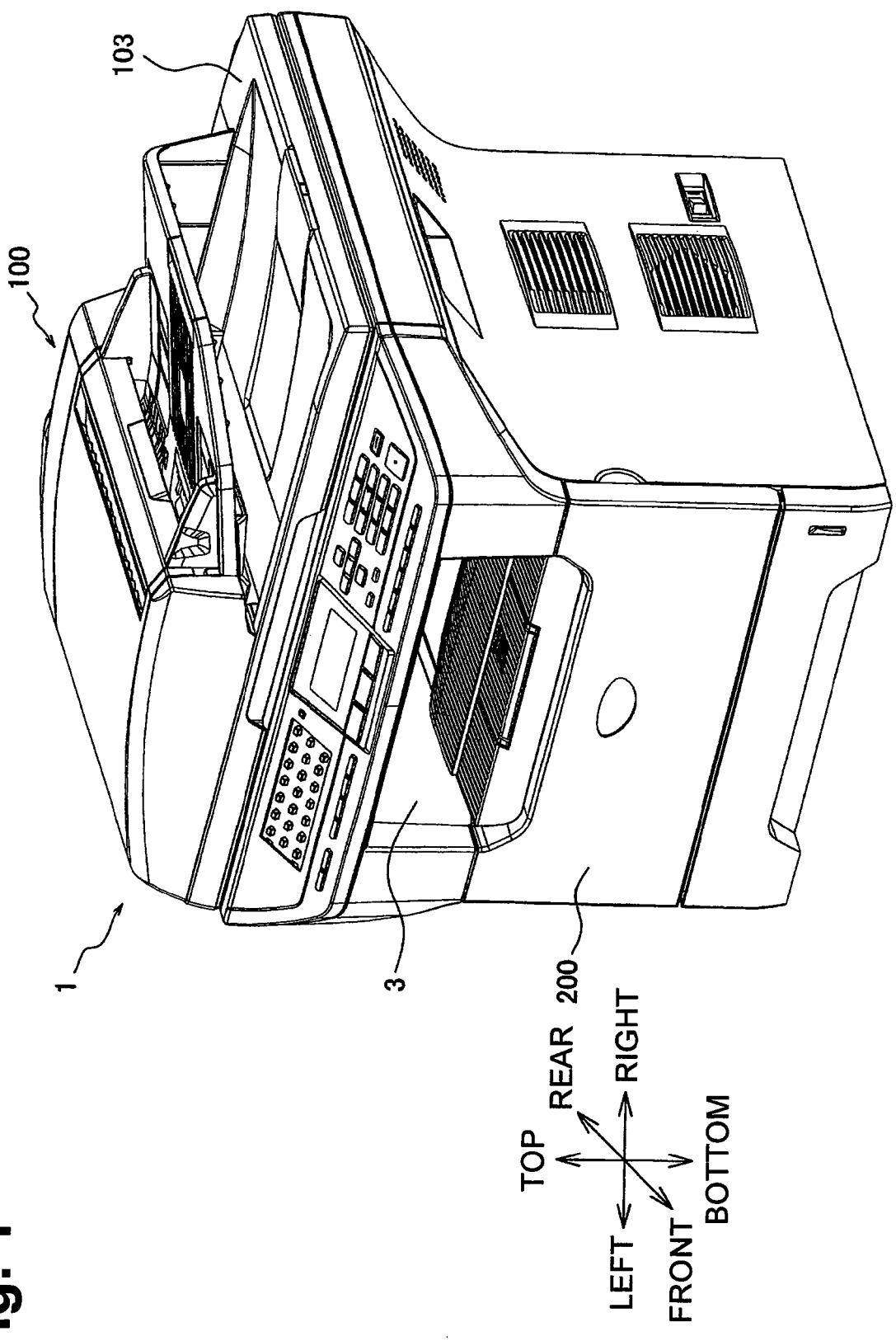
FIG. 1 is a front perspective view illustrating an image forming apparatus according to an illustrative aspect of the present invention.

As shown in FIG. 1, the image forming apparatus 1 includes an image reader 100, an image forming unit 200, and a sheet receiving space 3. The image reader 100 and the image forming unit 200 are provided above and below the sheet receiving space 3, respectively. The image reader 100 is configured to read an image, such as pictures, letters and/or characters, from a document. The sheet receiving space 3 includes a sheet output tray, on which a recording medium, such as a recording sheet, is to be placed after an image is formed on the recording sheet by the image forming unit 200.

The image reader 100 has a stationary document scanning function (e.g. a flatbed (FD) scanning function) of scanning a stationary document and a moving document scanning function (e.g. an automatic document feeder (ADF) scanning function) of scanning a moving document.

Figure 2:
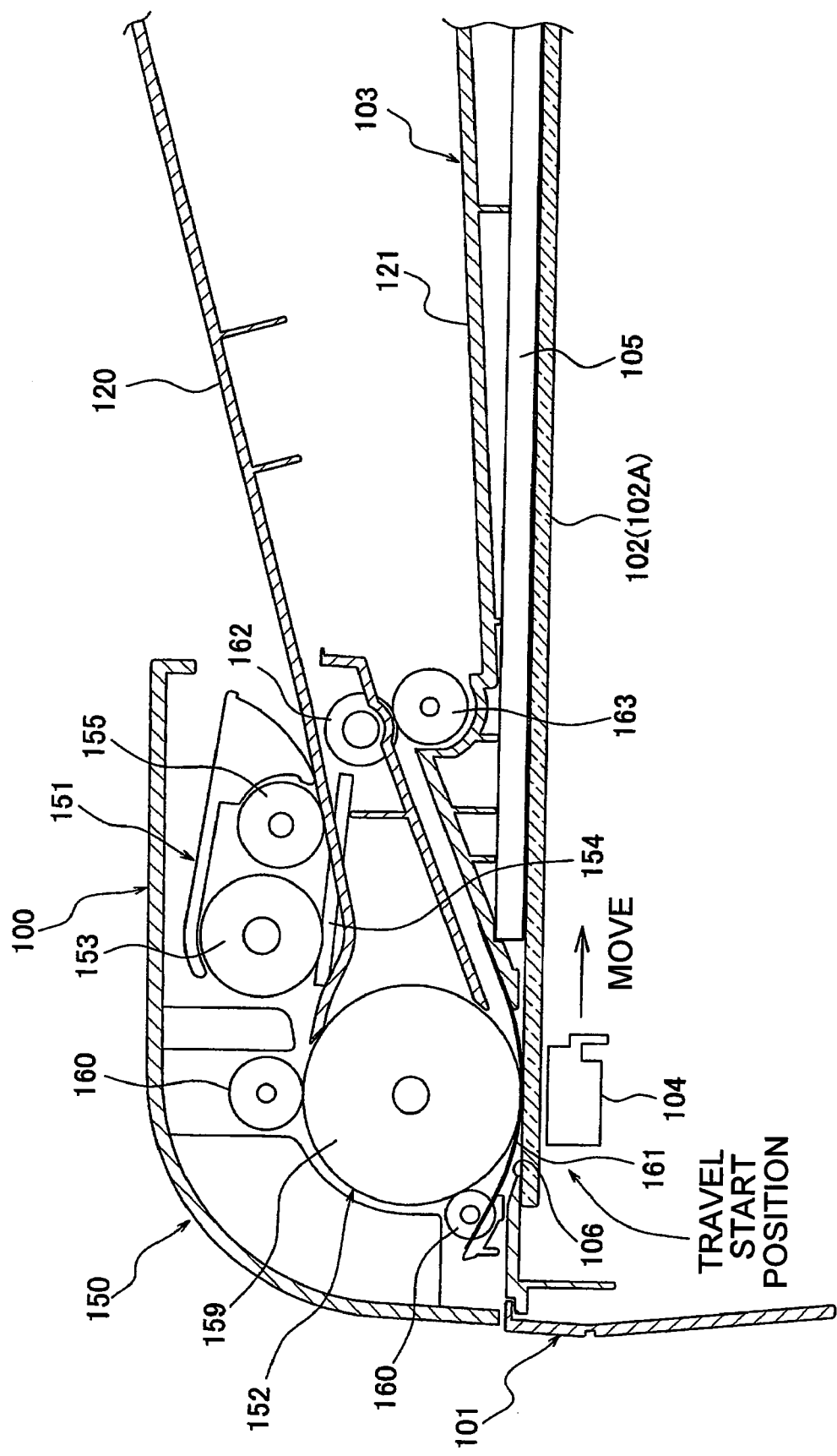
FIG. 2 is a central sectional view of an image reader according to a first illustrative aspect of the present invention.

As shown in FIG. 2, the image reader 100 includes a main body 101. The main body 101 includes a scan window 102 for the stationary document scanning function. A transparent platen 102A made of, for example, a glass or an acryl, is fitted into the scan window 102 so as to close the scan window 102.

The main body 101 includes a document cover 103 provided at a top of the main body 101. The document cover 103 is configured to be swingable and cover the scan window 102. When a document scanning operation is performed by the stationary document scanning function, a document is placed on the scan window 102 by manually rotating the document cover 103 upward to open the document cover 103.

The image reader 100 includes an image pickup device 104. The image pickup device 104 and the document cover 103 are provided on opposite sides of the scan window 102 in the main body 101. The image pickup device 104 is configured to receive light, which is irradiated onto a document placed on the scan window 102 and is then reflected off the document, and output an electrical signal based on the intensity of the received light. The image reader 100 is configured to read an image from a document by converting the image, such as pictures, letters and/or characters, recorded on the document into electrical signals, via the image pickup device 104.

The image pickup device 104 includes a contact image sensor (CIS), which is provided below the scan window 102 and is elongated in a direction perpendicular to a moving direction of the image pickup device 104 (i.e. in a direction perpendicular to a drawing sheet of FIG. 2).

The image pickup device 104 is attached to the main body 101 so as to be movable in a longitudinal direction of the main body 101 (i.e. in a right-left direction in FIG. 2). When the moving document scanning function is activated, the image pickup device 104 reads an image from a moving document via a passage opening 106 (described later) while staying immediately below the passage opening 106. When the stationary document scanning function is activated, the image pickup device 104 reads an image from a stationary document while moving along and immediately below the scan window 102.

The document cover 103 includes a document holder 105 at a portion of the document cover 103 facing the scan window 102. The document holder 105 is configured to press a document placed on the scan window 102 toward the scan window 102. The document holder 105 is attached to the document cover 103 so as to be able to shift with respect to the document cover 103. The document holder 105, that is, an entire surface of the document cover 103 facing the scan window 102, includes a member having a color of higher light reflectivity, for example, a white member.

The image reader 100 further includes a document feeding mechanism 150 (e.g. an automatic document feeder) at a portion corresponding to a travel start position (e.g. a scanning start position) of the image pickup device 104. The document feeding mechanism 150 is configured to automatically feed a document to be read onto the scan window 102.

The document cover 103 has the passage opening 106 on the scan window 102 side and at a position corresponding to the travel start position of the image pickup device 104. A document fed by the document feeding mechanism 150 passes through the passage opening 106. The passage opening 106 opens toward the scan window 102 while located at a position facing the scan window 102 when the document cover 103 covers the scan window 102.

The image reader 100 includes a document tray 120 on which one or a plurality of documents to be read are placed. Documents stacked on the document tray 120 are conveyed onto the scan window 102, one by one, by the document feeding mechanism 150 and then are discharged onto a document output tray 121.

The document feeding mechanism 150 includes a separation mechanism 151 and a conveyor mechanism 152. The separation mechanism 151 is configured to separate loaded documents, one by one, from the stack of the documents. The conveyor mechanism 152 is configured to convey a document separated by the separation mechanism 151 onto the scan window 102 (i.e. the passage opening 106).

The separation mechanism 151 includes a separation roller 153, a separation pad 154, and a pickup roller 155. The separation roller 153 is configured to apply a conveying force onto a topmost document of the loaded documents in a stacked direction of a plurality of documents stacked in a top-bottom direction. The separation pad 154 is disposed so as to face the separation roller 153. The separation pad 154 is configured to contact the document from a side opposite to the separating roller 153 and apply a conveying resistance against the document. The pickup roller 155 is configured to pickup several documents from the stack of documents placed on the document tray 120 and feed the several documents to the separation roller 153.

The conveyor mechanism 152 includes a supply roller 159 and a pair of pinch rollers 160. The supply roller 159 is configured to change a conveying direction of a document conveyed by the separation mechanism 151 toward the scan window 102 and apply a conveying force onto the document. Each of the pair of pinch rollers 160 is configured to press the document against the supply roller 159.

The supply roller 159 is disposed immediately above the passage opening 106. The document feeding mechanism 150 includes a guide member 161 at the passage opening 106. The guide member 161 is configured to guide a document conveyed by the document feeding mechanism 150 toward the document output tray 121. The guide member 161 may be made of a transparent film member, such as polyethylene terephthalate (PET) or a transparent resin film having elasticity, such as polyamide. The guide member 161 is disposed so as to close the passage opening 106.

The guide member 161 is disposed such that one end of the guide member 161 (e.g., a left end) is extended to a position beyond a contact point of one of the pinch rollers 160 (e.g., a lower pinch roller 160) with the supply roller 159. With this structure, a document may be guided toward the document output tray 121 without being caught by the guide member 161.

Thus, a document automatically fed from the document tray 120 is guided and conveyed toward the document output tray 121 while sandwiched between the supply roller 159 and the guide member 161. While the document passes through the passage opening 106, an image is read from the moving document.

The document feeding mechanism 150 includes a discharge roller 162 and a pinch roller 163. The discharge roller 162 is configured to discharge the document, which has been scanned, onto the document output tray 121. The pinch roller 163 is configured to press the document against the discharge roller 162.

Figure 3:
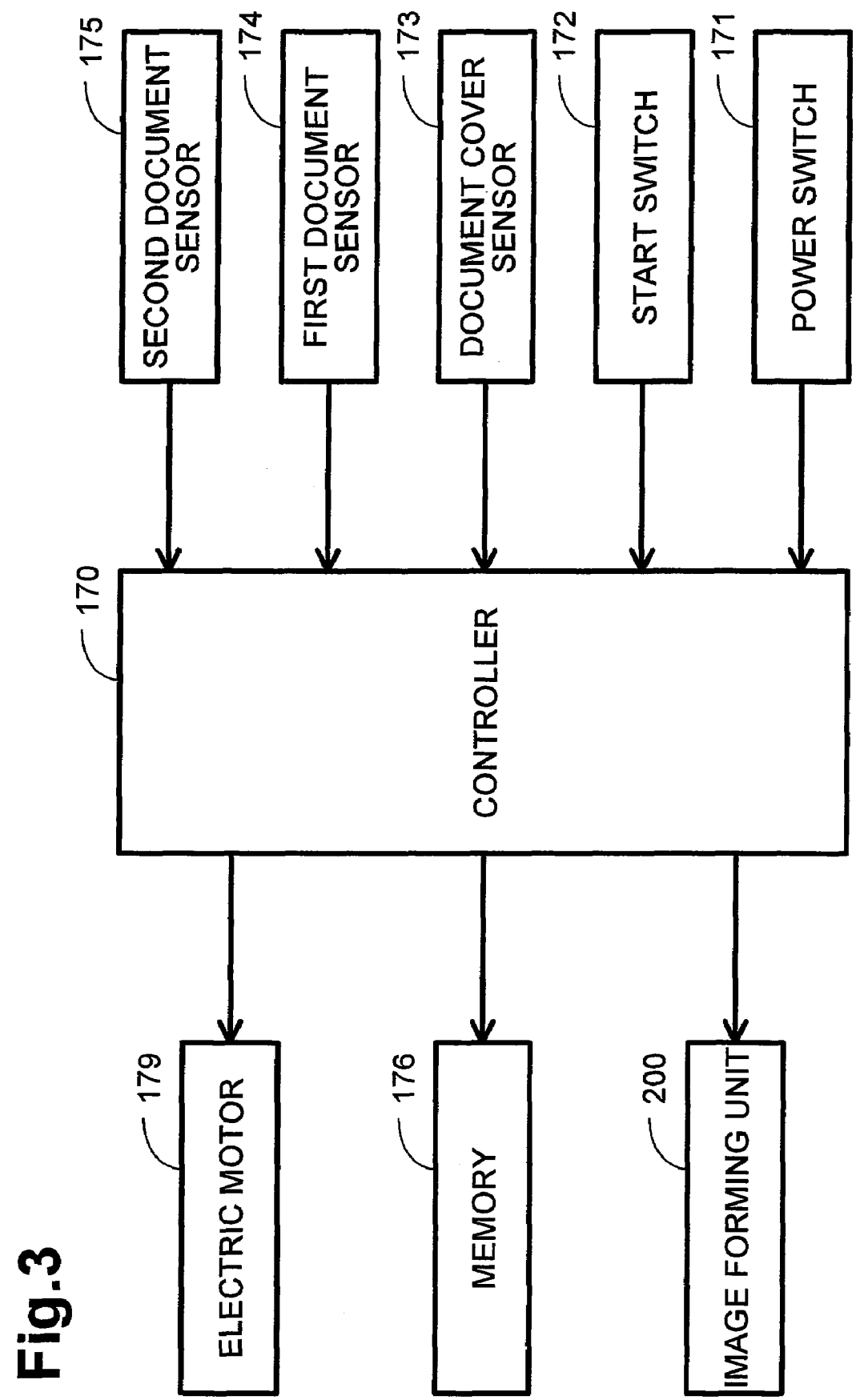
FIG. 3 is a block diagram showing an electrical configuration of the image forming apparatus according to the first illustrative aspect of the present invention.

Referring to FIG. 3, an electrical configuration of the image forming apparatus 1 will be described below. The image forming apparatus 1 includes a controller 170, a power switch 171, a start switch 172, a document cover sensor 173, a first document sensor 174, a second document sensor 175, a memory 176, an electric motor 179, and the image forming unit 200. The power switch 171 is used to activate the image forming apparatus 1. The start switch 172 is used to perform a copying function or an image reading function (i.e., a scanning function). The power switch 171 and the start switch 172 are typically operated by the user. However, it is also possible for the power switch 171 and the start switch 172 to be operated by a machine or another computer.

The document cover sensor 173 is configured to detect whether the scan window 102 is covered with the document cover 103. The first document sensor 174 is configured to detect whether a document is placed on the document tray 120. The second document sensor 175 is configured to detect whether a document is placed on the scan window 102.

Signals output from the power switch 171, the start switch 172, the document cover sensor 173, the first document sensor 174, and the second document sensor 175 are input into the controller 170. The controller 170 is configured to control the electric motor 179, which is configured to drive the separation roller 153, and operations of the image forming unit 200, based on the output signals.

The controller 170 includes a microcomputer including a central processing unit (CPU), a read-only memory (ROM), and a random access memory (RAM), and is configured to control the electric motor 179 in accordance with a program stored in the ROM.

The memory 176 is configured to store electronic data of an image read from a document by the image reader 100 and other information or data. The memory 176 includes a non-volatile memory, such as a flash memory.

Figure 4:
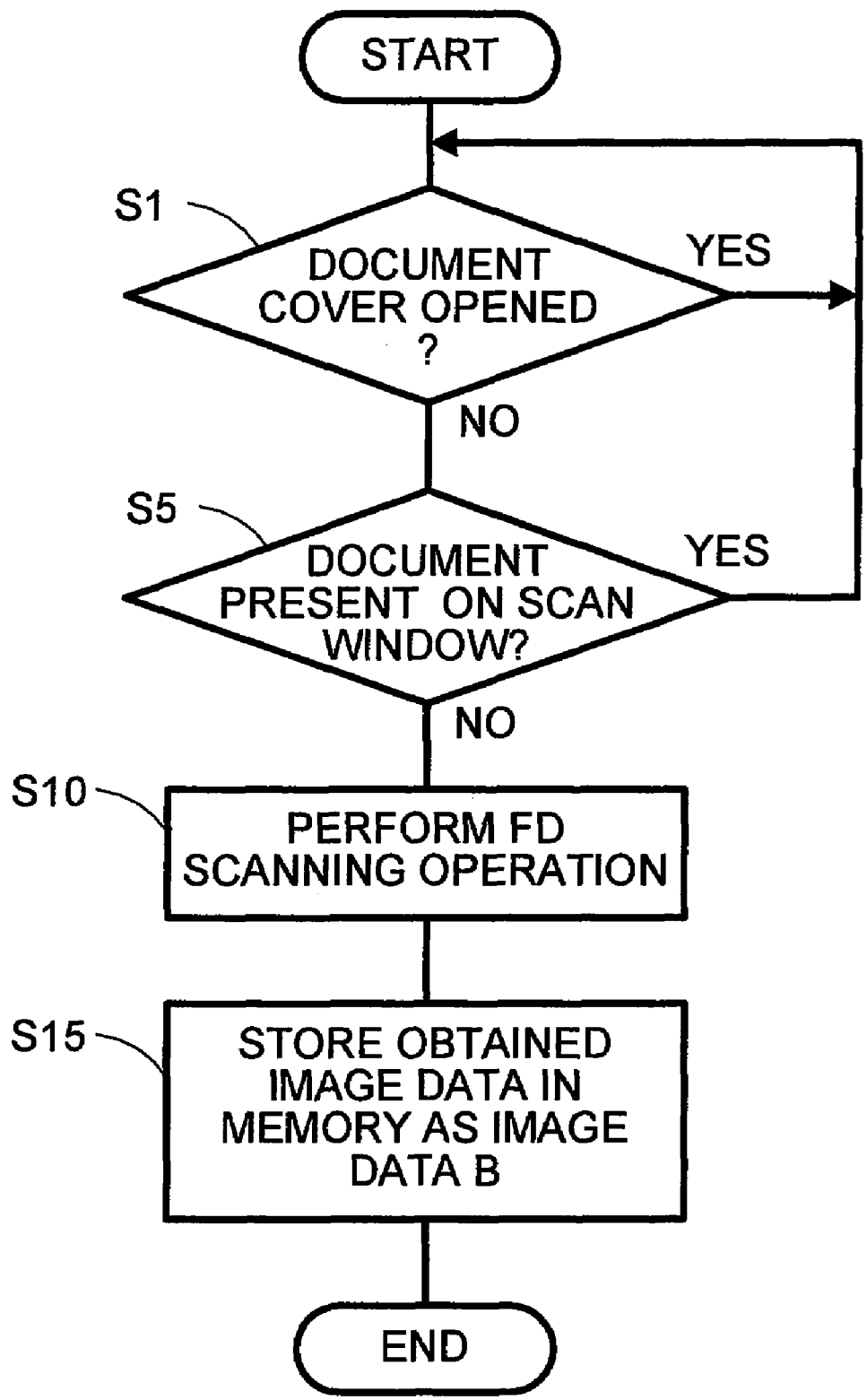
FIG. 4 is a flowchart of a control process that is to be performed when a power switch is turned on according to the first illustrative aspect of the present invention.

A control process that is performed by the controller 170 when the image forming apparatus 1 (the image reader 100) is activated by turning on the power switch 171 will now be described with reference to FIG. 4. Upon the start of the control process, the controller 170 determines whether the document cover 103 is opened with respect to the scan window 102, i.e., whether the scan window 102 is covered with the document cover 103, based on a detection signal issued from the document cover sensor 173 at operation S1.

If the controller 170 determines that the document cover 103 is closed with respect to the scan window 102 (S1: NO), the controller 170 then determines whether there is a document placed on the scan window 102 based on a detection signal issued from the second document sensor 175 (S5). If the controller 170 determines that there is no document placed on the scan window 102 (S5: NO), a document scanning operation is performed by the stationary document scanning function (i.e. the flatbed (FD) scanning operation is performed) without a document placed on the scan window 102 (S10).

That is, if the controller 170 determines that there is no document placed on the scan window 102 (S5: NO), the entire surface of the document cover 103 facing the scan window 102 including the passage opening 106 is scanned by the image pickup device 104 while no document is placed on the scan window 102 (S10). Then, the obtained image data is stored in the memory 176 as image data B (S15) and then the control process ends.

At operation S1, if the controller 170 determines that the document cover 103 is opened (S1: YES), or if the controller 170 determines that there is a document placed on the scan window 102 at operation S5 (S5: YES), processing returns to operation S1 to determine again whether the document cover 103 is opened.

A control process that is performed by the controller 170 when the start switch 172 is operated while the copying function has been selected will now be described with reference to FIG. 5. Upon the start of the control process, the controller 170 determines whether there is a document placed on the document tray 120 based on a detection signal issued from the first document sensor 174 (S100).

If the controller 170 determines that there is a document placed on the document tray 120 (S100: YES), the document feeding mechanism 150 is activated to automatically feed the document placed on the document tray 120 toward the passage opening 106 (i.e., the scan window 102) and the automatically-fed document (i.e., the moving document) is scanned (i.e., the ADF scanning operation) and the obtained image data is then stored in the memory 176 as image data A (S105). The image data A is then printed onto a recording sheet by the image forming unit 200 (S130) and the control process ends.

If the controller 170 determines that there is no document placed on the document tray 120 (S100: NO), the controller 170 determines whether the document cover 103 is opened (S10) in a similar manner to the processing at operation S1 of FIG. 4. If the controller 170 determines that the document cover 103 is closed (S110: NO), the flatbed scanning operation is performed by the stationary document scanning function and the obtained image data is stored in the memory 176 as image data A (S115).

Then, an image data defining processing is performed (S120 and S125). First, the image data B stored at operation S15 (see FIG. 4) and the image data A obtained at operation S15 are compared with each other and image data included within edges of the document is regarded as exact image data A obtained by the stationary document scanning function (S120). The image data A is then corrected (S125). The details of processing of S120 and S125 will be described later.

Then, the exact image data A obtained by the image data defining processing is printed on a recording sheet by the image forming unit 200 (S130), and the control process ends. At operation S110, if the controller 170 determines that the document cover 103 is opened (S110: YES), the flatbed scanning operation is performed by the stationary document scanning function and the obtained image data is stored in the memory 176 as image data A (S135). Then, image data obtained at operation S135 (i.e., image data A) is printed onto a recording sheet by the image forming unit 200 (S130) without performing the image data defining processing at operations S120 and S125, and the control process ends.

The control process shown in FIG. 5 is performed when the start switch 172 is operated while the copying function has been selected. However, when the start switch 172 is operated while the image reading function (i.e. the scanning function) has been selected, a control process similar to that shown in the flowchart of FIG. 5 is performed except that processing of operation S130 is not performed.

The image reader 100 is configured to read an image from a document in either monochrome or color. Hereinafter, the image data defining processing (S120 and S125) will be described in detail in a case where the image reader 100 reads an image from a document in monochrome for the sake of clarity.

Figure 7A:
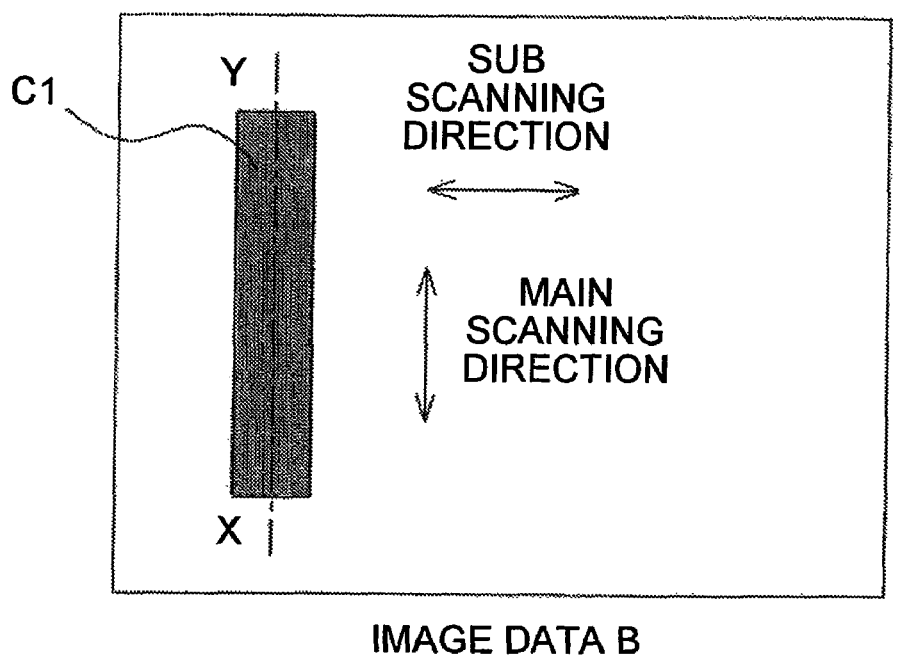
FIG. 7A represents an example of image data when a document scanning operation is performed without a document placed on a scan window.

The light reflectivity at the passage opening 106 is relatively low, so that the image data B, which is obtained by the stationary document scanning function with no document placed on the scan window 102, may contain a darker portion (e.g. a black portion) at an area corresponding to the passage opening 106 (hereinafter, the darker portion is referred to as a passage opening corresponding portion C1), as shown in FIG. 7A.

Figure 7B:
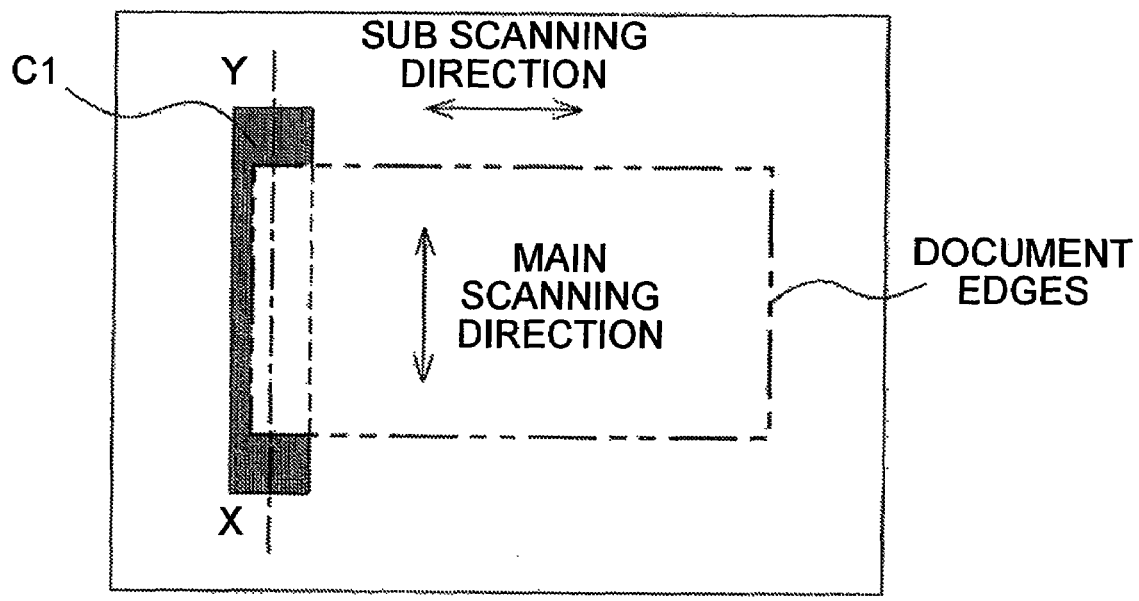
FIG. 7B represents an example of image data when the document scanning operation is performed with a document placed on the scan window.

The entire surface of the document cover 103 facing the scan window 102 includes a member having a color of higher light reflectivity, for example, a white member. Therefore, as shown in FIG. 7B, the image data A, which is obtained by the stationary document scanning function with a document placed on the scan window 102, may contain a lighter portion (e.g., a white portion) and a darker portion (e.g., a black portion). The white portion occupies an area corresponding to the document (which is an area indicated inside a double dot and dashed line in FIG. 7B) and an area other than the passage opening corresponding portion C1. The black portion occupies an area corresponding to the passage opening corresponding portion C1 where the document is not present.

Figure 6A:
FIGS. 6A and 6B are graphs representing examples of scanned outputs from an image pickup device.
Figure 6B:
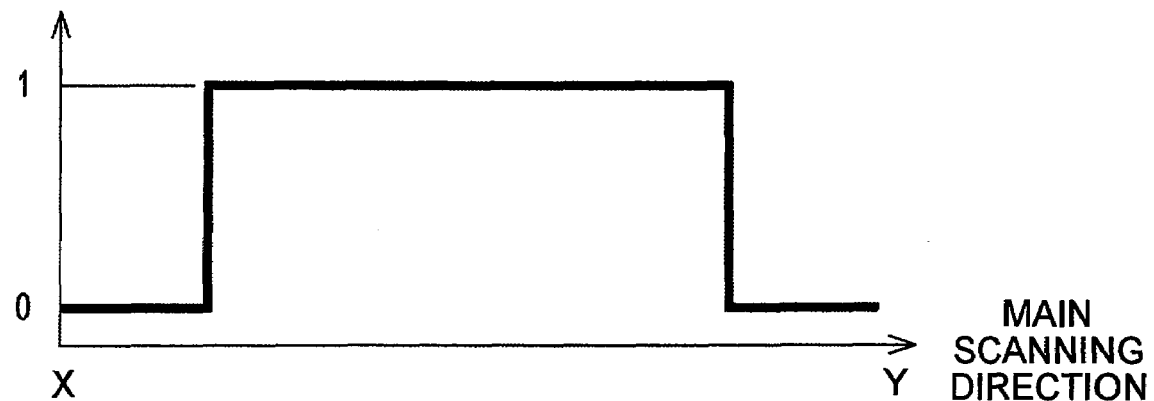

Assuming that the white (i.e., lighter) portion is indicated by "1 (one)" and the black (i.e., darker) portion is indicated by "0 (zero)" in each image data, FIGS. 6A and 6B show graphs representing variations in read image data corresponding to the passage opening corresponding portion C1 along a main scanning direction at a position indicated by a dot and dashed line X-Y in FIGS. 7A and 7B, respectively, wherein FIG. 6A shows the image data B and FIG. 6B shows the image data A. In FIG. 6B, the graph ignores variations of light and dark in an original image recorded on a document.

The image data B contains a black portion ("0") at an entire area corresponding to the passage opening corresponding portion C1 across the main scanning direction as shown in FIG. 6A. The image data A contains both a white portion ("1") and a black portion ("0") across the main scanning direction as shown in FIG. 6B. The white portion in the image data A corresponds to a document existing in the passage opening corresponding portion C1 because the portion where the passage opening 106 faces the document laid under the passage opening 106 has higher light reflectivity than the portion where the passage opening 106 does not face the document. The black portion in the image data A corresponds to the remainder of the area in the passage opening 106, i.e., the portion where the passage opening 106 does not face the document.

The controller 170 compares the image data corresponding to the passage opening 106 in the image data A and the image data corresponding to the passage opening 106 in the image data B with each other from one side (e.g., an X-side) of the main scanning direction to determine a position at which a difference is found between the value of the image data A and the value of the image data B. Hereinafter, the position at which the difference is found is referred to as a first different position. Then, the controller 170 stores the first different position.

Next, the controller 170 compares the image data corresponding to the passage opening 106 in the image data A and the image data corresponding to the passage opening 106 in the image data B with each other from the other side (e.g., a Y-side) of the main scanning direction to determine a position at which a difference is found between the value of the image data A and the value of the image data B. Hereinafter, the position at which the difference is found is referred to as a second different position. Then, the controller 170 stores the second different position.

The controller 170 determines the first different position and the second different position as a first edge and a second edge, respectively, of the document in the main scanning direction in the image data A. After the document edges detection, the controller 170 corrects the color of the portion of the passage opening corresponding portion C1 beyond the first and second edges of the document to the color that is the same as the surface of the document cover 103 facing the scan window 102 (e.g., white ("1")) in the image data A. The comparison of the image data A and B and the detection of the edges of the document correspond to the processing of operation S120 in FIG. 5. The color correction corresponds to the processing of operation S125 in FIG. 5.

In the first illustrative aspect, the edges of the document are detected (S120) and image data included within the detected edges of the document is determined as exact image data read by the stationary document scanning function. Thus, the incorporation of a darker portion (i.e., undesired shades) into a portion of the read image data corresponding to the passage opening 106 may be minimized when the document scanning operation is performed by the stationary document scanning function.

In addition to the elimination of the darker portion from the read image data, the image reader may be reduced in size such that scan windows may be integrated to provide a single scan window to be commonly used to scan both a stationary document and a moving document.

Because the image reader includes the single scan window which is commonly used as described above, a cost of manufacturing the image reader may be reduced as compared with that required for manufacturing an image reader including two separate scan windows for the stationary document scanning function and the moving document scanning function.

If a relatively thick document, such as a book or a brochure, is scanned by the stationary document scanning function, it may be difficult to perform the document scanning operation with the scan window 102 completely covered with the document cover 103. In this case, a portion of the scan window 102 where the document is not present may be read as a darker portion.

If the document scanning operation is performed while the controller 170 determines that the document cover 103 is not closed, it is difficult to distinguish between a darker portion occurring at a portion corresponding to the passage opening 106 and a darker portion occurring at a portion of the scan window 102 where the document is not present. Thus, it may be difficult to effectively perform the image data defining processing.

Accordingly, in the first illustrative aspect, if it is detected that the document cover 103 is closed with respect to the scan window 102, the image data defining processing is performed. If it is detected that the document cover 103 is opened with respect to the scan window 102, the image data defining processing is not performed and the obtained image data A is printed onto a recording sheet as it is.

During the detection of document edges, if a difference is found between the image data A and the image data B in the comparison performed from one side of the main scanning direction, the position at which the difference is found is regarded as the first difference position. Then, if a difference is found between the image data A and the image data B in the comparison performed from the other side of the main scanning direction, the position at which the difference is found is regarded as the second difference position. Thus, for example, if an image is recorded on a document, edges of the document may be correctly identified and the image data A and the image data B may not compared with each other on a border between an image recorded portion and a blank portion of the document.

Accordingly, the image recorded portion on the document may not be mistakenly detected as the edges of the document. Thus, the incorporation of a darker portion (i.e., undesired shades) corresponding to the passage opening 106 into the read image data may be minimized.

A related art image reader may include an inclined surface that is continued from a glass surface of a scan window for the moving document scanning function. In the related art image reader, a document conveyed onto the scan window in the document conveying mechanism is scanned at the scan window and then the conveying direction of the document is changed toward a document output tray by the inclined surface. Therefore, the related art image reader includes the inclined surface at the scan window to guide and convey the scanned document to the document output tray.

If, however, such an inclined surface is provided at the scan window 102 of the image reader 100, a document may not be scanned due to the presence of the inclined surface because the scan window 102 includes a single scan window to be commonly used to scan both a stationary document and a moving document.

Accordingly, instead of such an inclined surface, the image reader 100 includes the guide member 161 configured to close the passage opening 106 and guide a document to be fed by the document feeding mechanism 150 toward the document output tray 121. The guide member 161 may be made of a transparent member, so that an image recorded on a document may be read through the guide member 161.

With this structure, a scanned document may be conveyed to the document output tray 121 although a single scan window 102 is commonly used for the stationary document scanning function and the moving document scanning function in the image reader 100.

In other words, an additional scan window intended for a moving document scanning function is not necessary in an image reader according to the first illustrative aspect having the moving document scanning function, so that the image reader may be reduced in size in the main scanning direction.

A second illustrative aspect of the present invention will now be described. In the first illustrative aspect, edges of a document are detected by comparing image data corresponding to the passage opening corresponding portion C1 in the image data A and image data corresponding to the passage opening corresponding portion C1 in the image data B. In the second illustrative aspect, edges of a document are detected without performing such a comparison between the image data A and the image data B.

As shown in FIG. 6B, the read image data A may contain a lighter portion (e.g., a white portion) at an area corresponding to the document existing in the passage opening corresponding portion C1 and a darker portion (e.g., a black portion) at an area corresponding to the opening corresponding portion C1 where the document is not present.

A controller 170 according to the second illustrative aspect is configured to detect edges of a document. The controller 170 determines a change of light and dark (i.e., a contrast) in the image data A from one side in the main scanning direction. If the controller 170 finds a significant change of the contrast in the image data A, that is, if a value of the image data A is changed to "1" from "0", the controller 170 determines that the position at which the contrast is changed is regarded as a first edge position of the document. Then, the controller 170 determines a change of the contrast in the image data A from the other side in the main scanning direction. If the controller 170 finds a significant change of the contrast in the image data A, that is, if a value of the image data A is changed to "1" from "0", the controller 170 determines that the position at which the contrast is changed is regarded as a second edge position of the document.

In FIGS. 6A and 6B, the value of the image data is represented by binary notation, such as "0" and "1", in order to facilitate the description. In fact, however, the contrast is gradually changed from "0" to "1". For example, the contrast of a blank portion of a document (i.e., a portion where no image is recorded) may be read and stored in advance as a detection result. A threshold value of a change of the contrast may be determined in accordance with the detection result and it may be determined that a significant change of the contrast has occurred when the amount of change of the contrast exceeds the threshold value.

The threshold value may be manually set by a user, or a threshold value, which is an appropriate value with respect to a certain type of paper, may be stored in, for example, the ROM before the image forming apparatus is shipped from a plant.

Figure 8:
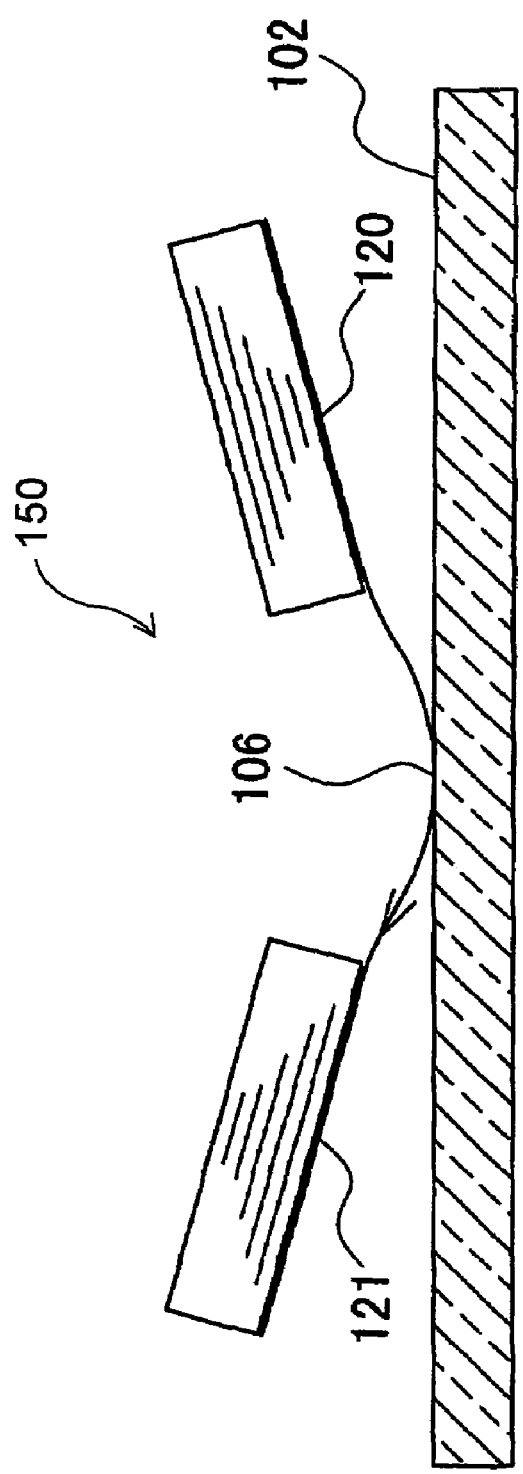
FIG. 8 illustrates an image reader according to a third illustrative aspect of the present invention.

A third illustrative aspect of the present invention will now be described with reference to FIG. 8. In the first and second illustrative aspects, the document feeding mechanism 150 is disposed such that the passage opening 106 faces the portion of the scan window 102 shifted toward one side of the scan window 102 in a sub scanning direction. Alternatively, according to the third illustrative aspect of the present invention, the document feeding mechanism 150 is disposed such that a passage opening 106 faces a substantially middle portion of a scan window 102 in the sub scanning direction.

In the third illustrative aspect, the image data defining processing is the same as that described above and used with the first or second illustrative aspect. Therefore, a repeated description will be omitted here for brevity.

A fourth illustrative aspect of the present invention will now be described with reference to FIGS. 9 to 11. As shown in FIG. 2 with respect to the first and second illustrative aspects, the guide member 161 is configured to close the passage opening 106 and is formed by the transparent film. In the fourth illustrative aspect of the present invention, the guide member 161 includes two thin-plate guide members 161A, 161B that are configured to be displaced in accordance to a width of a document to be automatically fed. (see FIG. 10).

Figure 9:
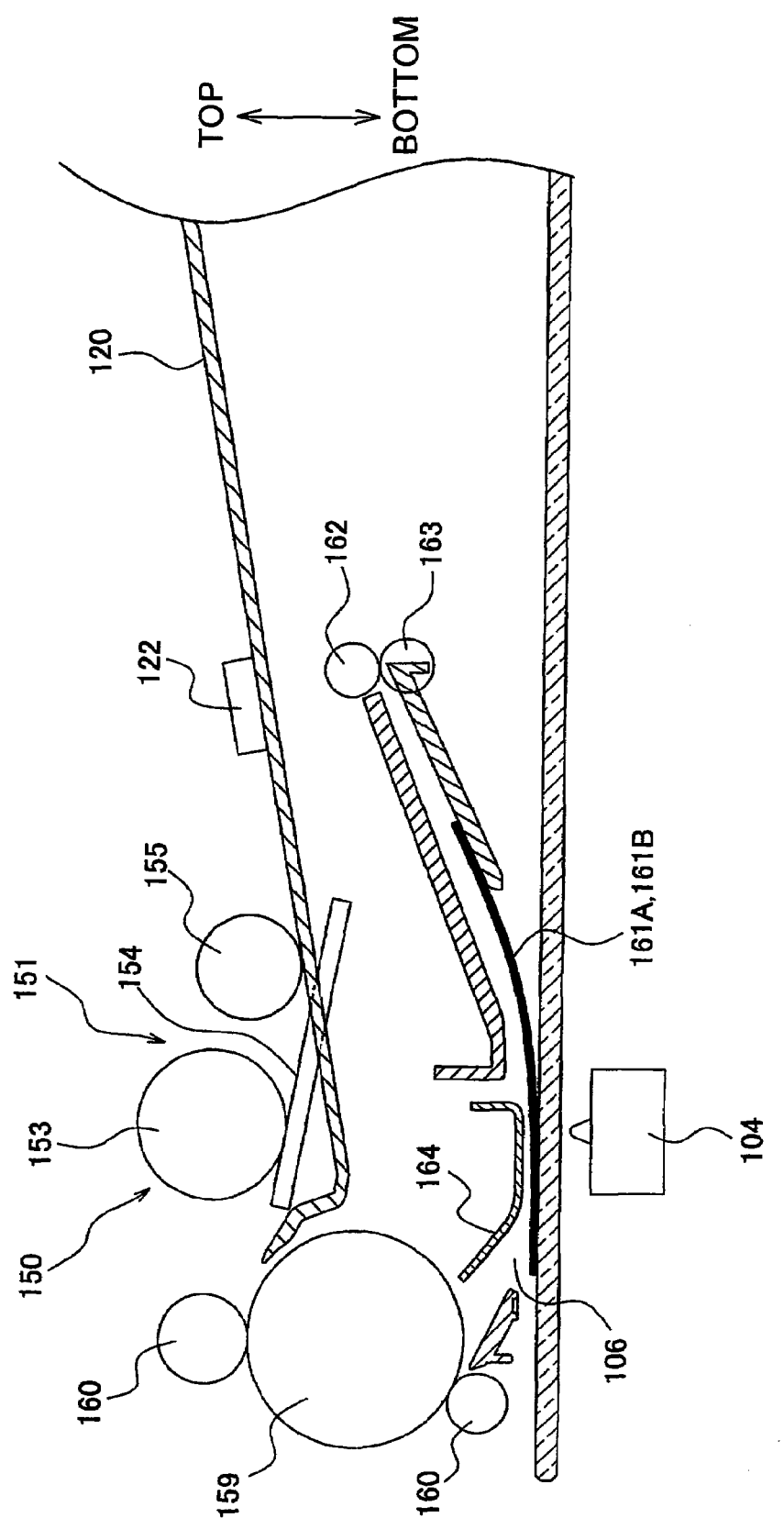
FIG. 9 is a sectional diagram showing schematic structures of a document feeding mechanism and its neighboring portions according to a fourth illustrative aspect of the present invention.

As shown in FIG. 9, a document tray 120 includes two document guides 122 configured to be slidable in the width direction and to come into contact with edges of a document in a width direction of the document to guide the conveyance of the document. Note that since FIG. 9 shows a side view of the image reader, only one side of one of the document guides 122 is shown.

The document width direction refers to a direction parallel to an extending direction of a surface of a document on which an image is recoded and perpendicular to the document conveying direction. In this fourth illustrative aspect, the document width direction is parallel to the main scanning direction of an image pickup device 104.

A supply roller 159 is disposed above the passage opening 106 and at a position shifted from the passage opening 106. A document holder 164 is provided at the passage opening 106 to hold a fed document which is allowed to be substantially parallel to a scan window 102.

The guide members 161A, 161B are provided below the document holder 164. As shown in FIG. 10, the guide members 161A, 161B are configured to be symmetric with respect to a substantially center line of a document in the document width direction when displaced in the main scanning direction.

The guide members 161A, 161B have inclined edges 161C, 161D, respectively. The inclined edges 161C, 161D are inclined with respect to the document conveying direction so as to be gradually separated from the center line of the document in the document width direction toward an upstream in the document conveying direction.

The guide members 161A, 161B may be made of a flexible (e.g., elastic) material, for example, polyethylene terephthalate, so that at least a portion of the scan window 102 corresponding to the document holder 164 and the guide members 161A, 161B can contact with each other as shown in FIG. 9.

Figure 11:
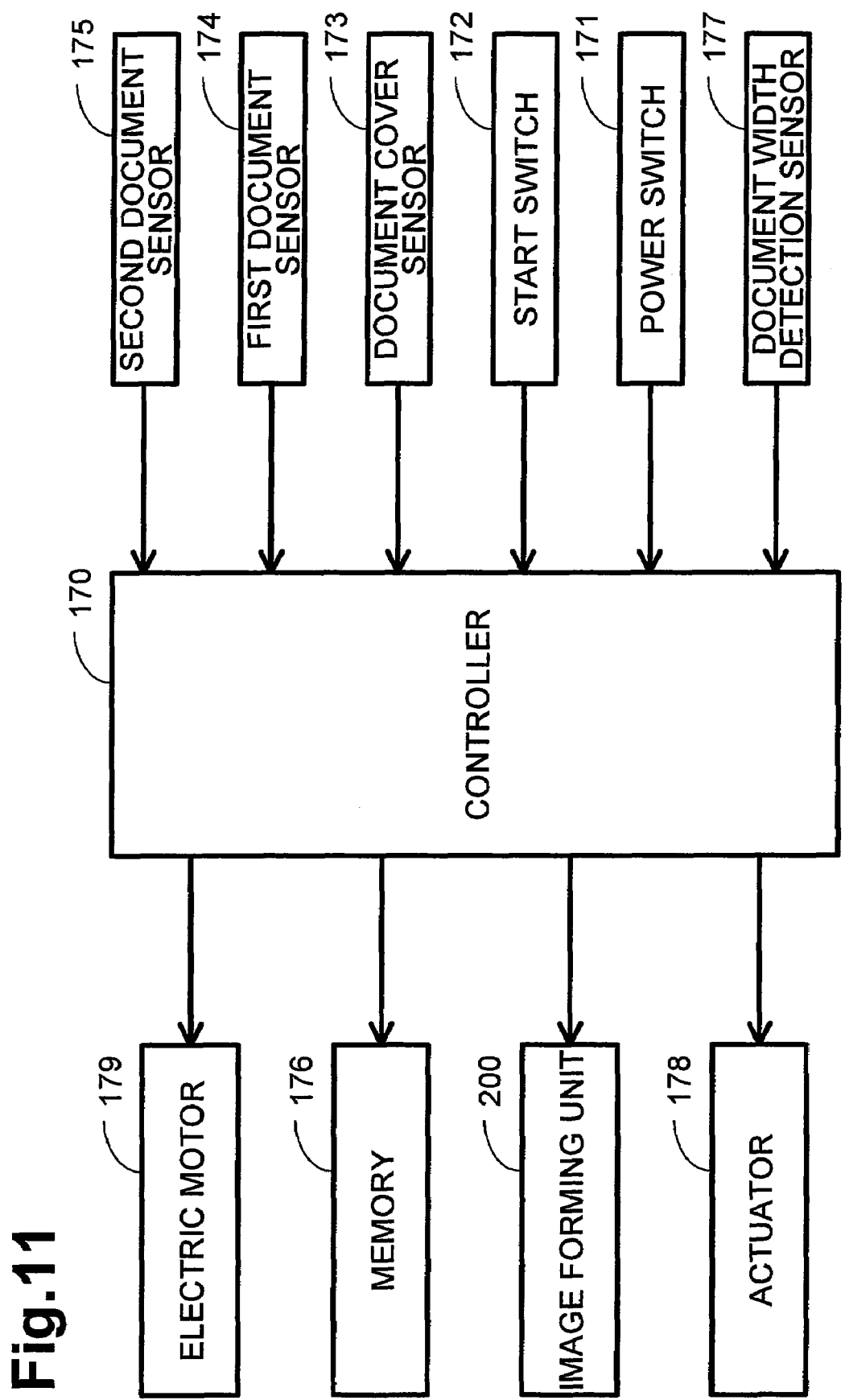
FIG. 11 is a block diagram showing an electrical configuration of an image forming apparatus according to the fourth illustrative aspect of the present invention.

As shown in FIG. 11, an image forming apparatus 1 according to the fourth illustrative aspect further includes a document width detection sensor 177 and an actuator 178. The document width detection sensor 177 is configured to detect a width of a document by detecting the positions of the document guides 122. The actuator 178 is configured to move the guide members 161A, 161B in the main scanning direction in accordance with a detection signal issued from the document width detection sensor 177. The detection signal issued by the document width detection sensor 177 is input into a controller 170. When a first document sensor 174 has detected the presence of a document on the document tray 120, the controller 170 controls the actuator 178 to move the guide members 161A, 161B in the main scanning direction (i.e., the document width direction) based on the detection signal.

Figure 10:
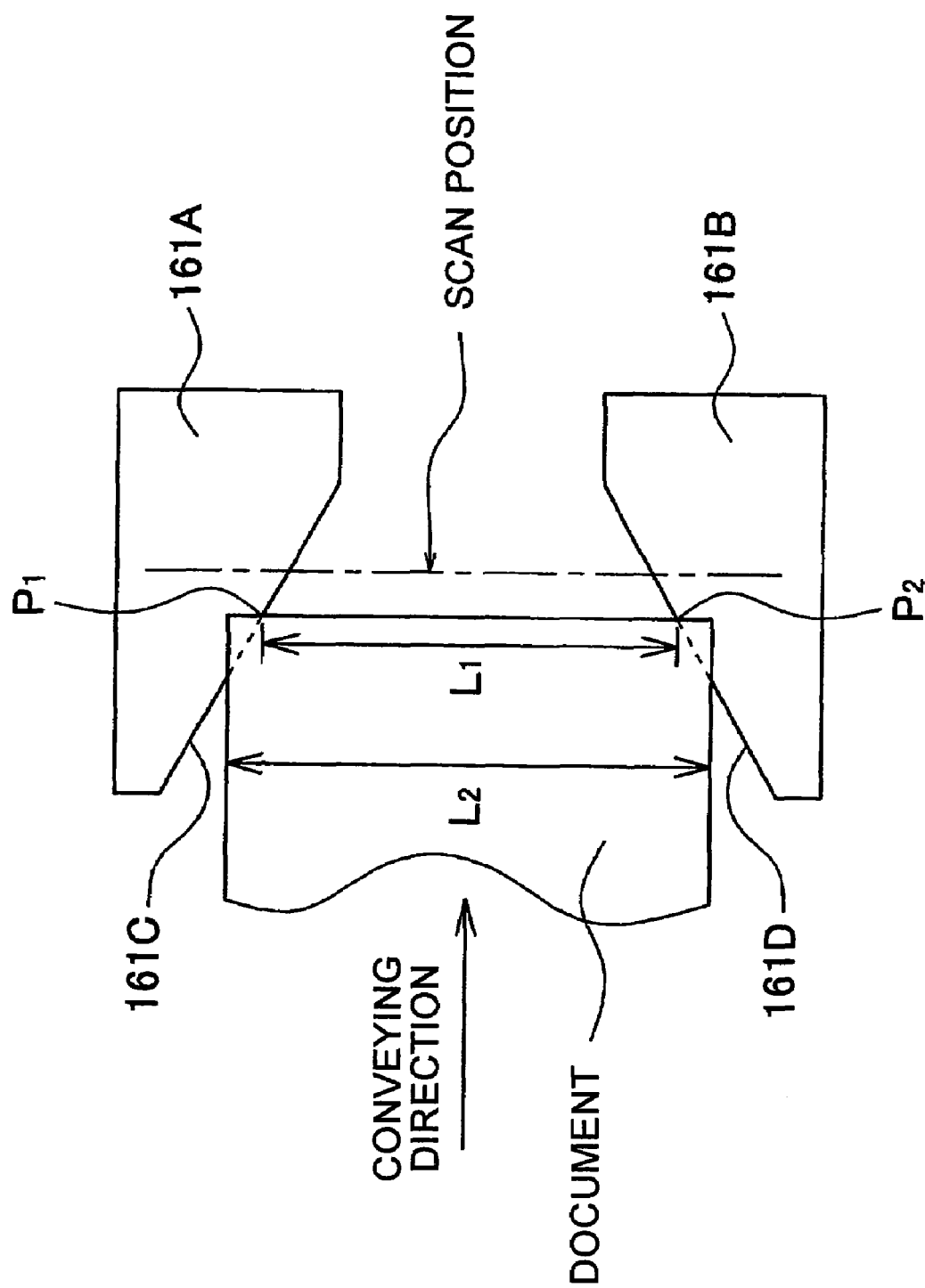
FIG. 10 is an explanatory diagram illustrating features of guide members according to the fourth illustrative aspect of the present invention.

Assume that points where a leading edge of a fed document in the document conveying direction contacts the guide members 161A, 161B are referred to as contact points P1, P2 (see FIG. 10). Specifically, as shown in FIG. 10, the controller 170 moves the guide members 161A, 161B so that a distance L1 between the contact points P1 and P2 becomes slightly shorter than a width L2 of the fed document.

The guide members 161A, 161B are moved a distance such that an image recorded on the document is not covered by the guide members 161A, 161B and the fed document is accurately picked up or guided by the guide members 161A, 161B. For example, the distance may be from about 2 mm to about 3 mm in this fourth illustrative aspect.

A document scan position at which the image pickup device 104 scans a document is provided downstream from the contact points P1, P2 with respect to the document conveying direction. (see FIG. 10). The moving amount of the guide members 161A, 161B is determined with consideration given to this point.

The document scan position may be provided upstream from the contact points P1, P2 with respect to the document conveying direction.

With the structure of the image reader according to the fourth illustrative aspect of the present invention, the guide members 161A, 161B need not be made of a transparent material in any configuration. Thus, this structure provides flexibility in selecting materials to be used for the guide members 161A, 161B. Moreover, for example, a rib may be added to the guide members 161A, 161B in order to reduce friction between the document and the guide members 161A, 161B. In addition, an image recorded on the document is read by the image pickup device 104 without reading through the guide members 161A, 161B, so that the image can be more clearly read as compared with the reading to be performed in the first and second illustrative aspects.

As shown in FIG. 10, the guide members 161A, 161B are moved in accordance with the width of a document to be fed. With this structure, a document conveyed to the passage opening 106 is picked up by the guide members 161A, 161B and the conveying direction of the document on the leading edge side is changed toward the document output tray 121. The image data defining processing to be performed in the fourth illustrative aspect is similar to the image data defining processing described above and performed with respect to the first or second illustrative aspect.

Figure 12:
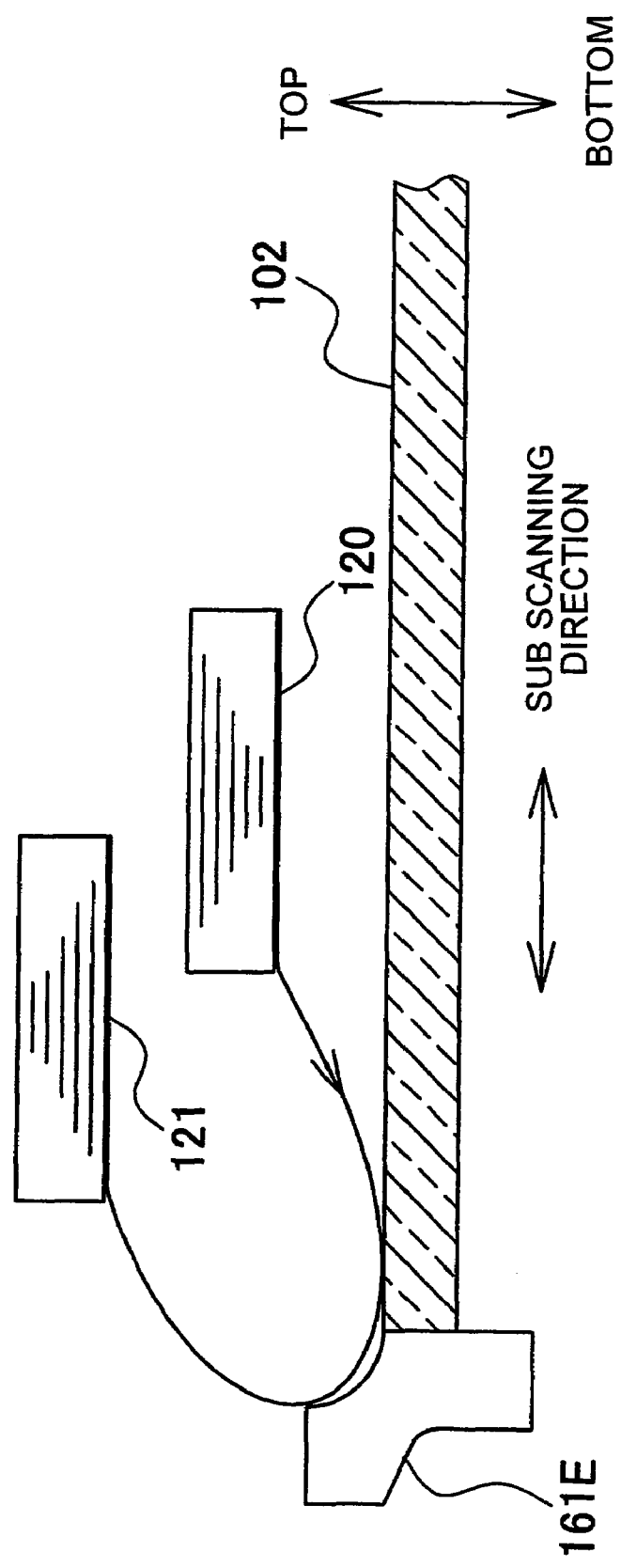
FIG. 12 illustrates an image reader according to a fifth illustrative aspect of the present invention.

A fifth illustrative aspect of the present invention will now be described with reference to FIG. 12. In the fourth illustrative aspect, the document output tray 121 is disposed below the document tray 120. In the fifth illustrative aspect, a document output tray 121 is disposed above a document tray 120. In addition, a position at which a document is read by the moving document scanning function, that is, a position at which a passage opening 106 faces a scan window 102, is provided at an end of the scan window 102 in the sub scanning direction and a guide member 161E is provided at a position shifted in the sub scanning direction from the scan window 102. The guide member 161E is configured to change the conveying direction of the document upward.

The image data defining processing performed in the fifth illustrative aspect is similar to the image data defining processing that is described above and used with the first or second illustrative aspect.

A document fed to the passage opening 106 is turned by the guide member 161E such that the conveying direction of the document is changed toward the document output tray 121. Because the guide member 161E is shifted from the scan window 102 in the sub scanning direction, the guide member 161E does not interfere with the image reading operation by the stationary document scanning function.

Figure 13:
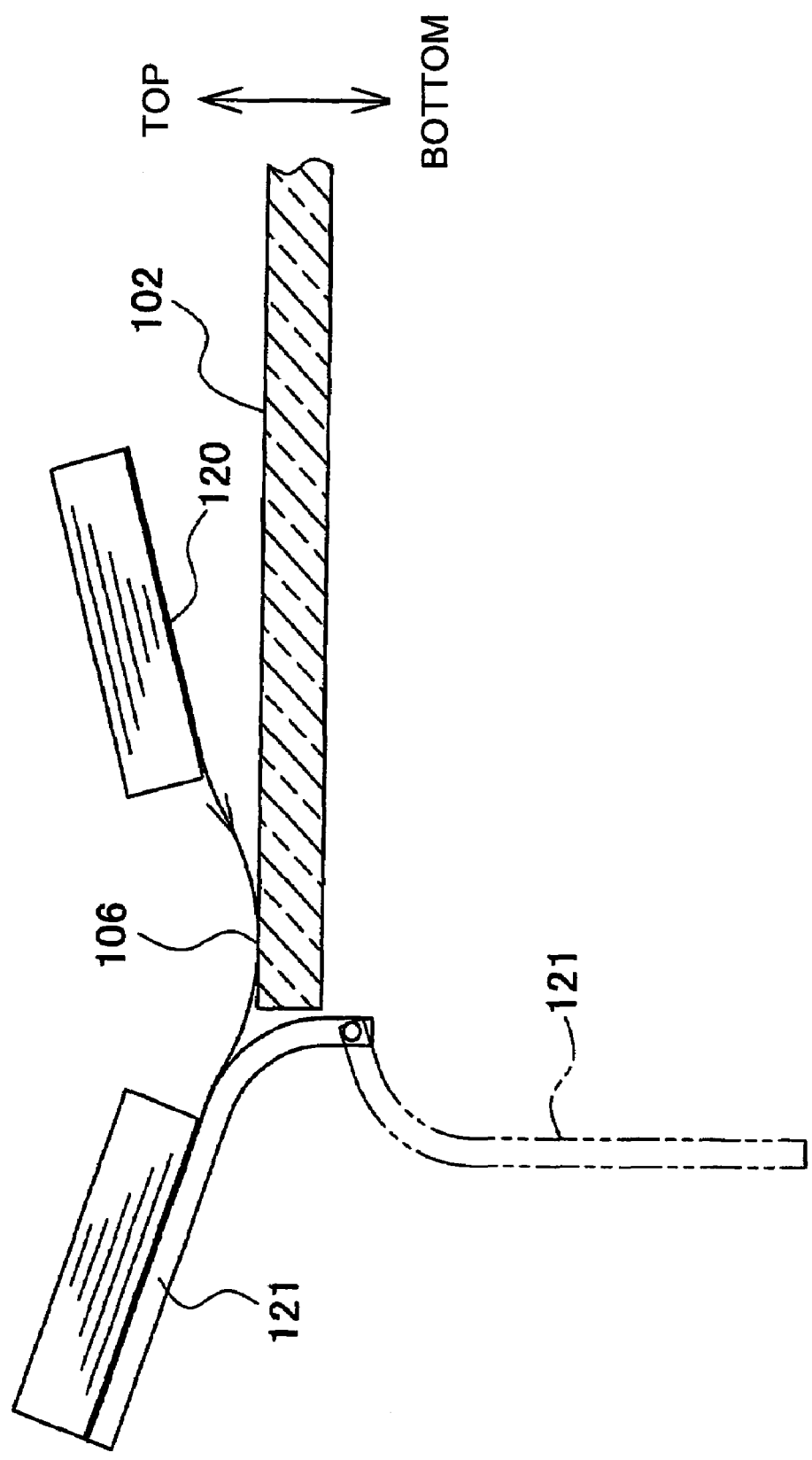
FIG. 13 illustrates an image reader according to a sixth illustrative aspect of the present invention.

A sixth illustrative aspect of the present invention will now be described with reference to FIG. 13. In the fifth illustrative aspect, the conveying direction of the document scanned by the moving document scanning function is changed to upward. In the sixth illustrative aspect, a scanned document is conveyed onto a document output tray 121 provided outside a scan window 102 without changing the conveying direction of the scanned document. The image data defining processing of the sixth aspect is similar to the image data defining processing described above and used with the first or second illustrative aspect.

The document output tray 121 is attached to a main body 101 of an image reader 100 so as to be swingable.

When a document is read by the moving document scanning function, that is, when the controller 170 determines that the first document sensor 174 has detected the presence of a document on the document tray 120, an actuator (not shown) controls the document output tray 121 to move from a retracted position indicated by a double dot and dashed line to a receiving position indicated by a solid line.

Thus, a scanned document is conveyed onto the document output tray 121 without the conveying direction of the document being changed. When the document scanning operation is not performed by the moving document scanning function, the document output tray 121 is located at the retracted position. Consequently, the image reader 100 may be reduced in size in its width direction.

The document output tray 121 may alternatively be configured such that the user manually moves the document output tray 121 from the retracted position to the receiving position.

Figure 14:
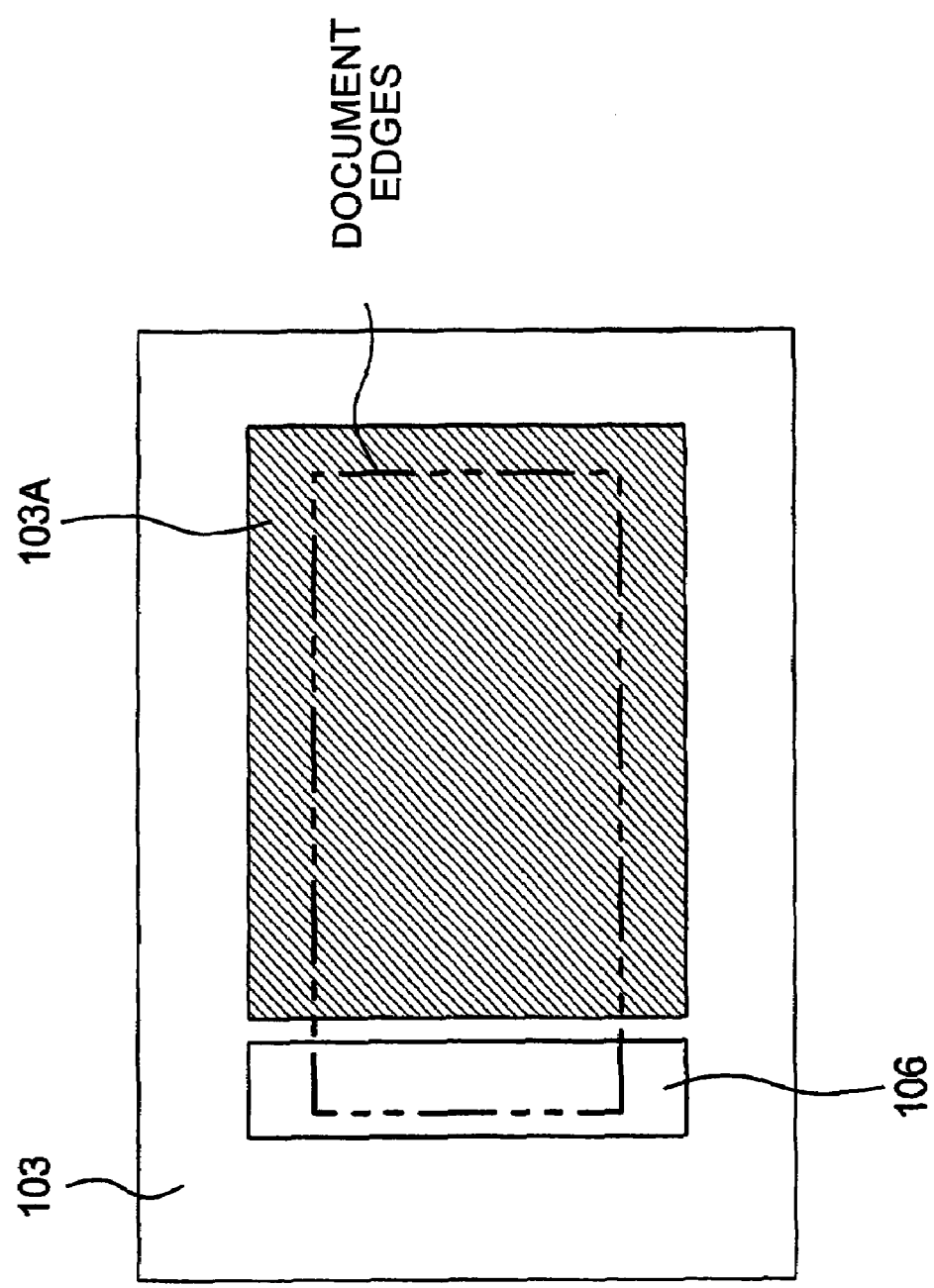
FIG. 14 shows a structure of a document cover according to a seventh illustrative aspect of the present invention.

A seventh illustrative aspect of the present invention will now be described with reference to FIG. 14. In the above-described illustrative aspects, the portion of the document cover 103 facing the scan window 102, other than the passage opening 106, is white. In the seventh illustrative aspect, the portion of the document cover 103 facing the scan window 102 includes a black area 103A covering at least a portion of the corresponding edges of the scan window 102.

The document cover 103 includes a portion having relatively low light reflectivity at a portion as a background of a document to be placed on the scan window 102, that is, a portion of the document cover 103 facing the scan window 102. When the relatively low light reflectivity portion, i.e., the black area 103A, overlaps a document, a value of image data A is significantly changed at a border between the black area 103A and a document. As a result, edges of the document are detected based on the change.

By the provision of the black area 103A at the position corresponding to the outer edge of the scan window 102, an area of the scan window 102 where a document is not placed is clearly read as a black portion or a dark shade when a document scanning operation is performed. Thus, a change of light and dark (i.e., a contrast) becomes obvious between an area at which a document is placed and an area at which a document is not placed. Accordingly, edges of a document may be more easily and correctly identified.

The black area 103A is extended both in the main and sub scanning directions, so that edges of a document in length and width directions may be clearly identified.

A variation of the seventh illustrative aspect will now be described with reference to FIG. 15. A document generally has a rectangular shape, so that all edges of a document may be easily assumed if at least one edge in each of the length and width directions of the document is identified.

Accordingly, in this variation, band-shape black areas 103A are provided so as to intersect perpendicular to each other as shown in FIG. 15.

The black areas 103A extend both in the main and sub scanning directions of the image pickup device 104, so that edges of the document may be clearly identified.

As illustrated, although the image data B is read and stored when the power is turned on in the first or the second illustrative aspect, the image data B may be read and stored at regular intervals or image data corresponding to the image data B may be stored in advance in the memory 176 before shipping.

The image data defining processing may be performed when the stationary document scanning function is performed with the document cover 103 opened.

According to the above-described illustrative aspects of the present invention, the edges of a document are detected by the edge detector, and image data included within the detected edges of the document is determined as exact image data read by the stationary document scanning function. Thus, the incorporation of a darker portion (i.e., undesired shades) into a portion of the read image data corresponding to the passage opening may be minimized when the document scanning operation is performed by the stationary document scanning function.

In addition to the elimination of the darker portion from the read image data, an image reader according to the above-described illustrative aspects of the present invention may be reduced in size such that scan windows may be integrated to provide a single scan window to be commonly used to scan both a stationary document and a moving document.

Because the image reader according to the above-described illustrative aspects of the present invention includes the single scan window to be commonly used as described above, the cost of manufacturing the image reader may be reduced as compared with the cost of manufacturing a related art image reader including two separate scan windows for the stationary document scanning function and the moving document scanning function.

Other aspects of the present invention will be apparent to persons of ordinary skill in the art from the above detailed description and the accompanying drawings.

While the present inventive concept has been described in detail with reference to specific illustrative aspects thereof, it will be understood by those skilled in the art that various changes, arrangements, and modifications in form and details may be made therein without departing from the spirit and scope of the invention as defined by the appended claims.

What is claimed is:

1. An image reader comprising:
   a stationary document scanning device which is configured to scan a stationary document;
   a moving document scanning device which is configured to scan a moving document;
   a scan window which is configured to support the stationary document;
   a document cover which is configured to be displaced with respect to the scan window and to cover the scan window, the document cover comprising an opening located at a position facing the scan window when the document cover covers the scan window;
   a document feeding mechanism which is disposed at the document cover and is configured to feed the moving document through the opening in the document cover and onto the scan window when the moving document is to be scanned by the moving document scanning device;
   an image pickup device which is disposed on an opposite side of the scan window from the document cover and is configured to read an image from the stationary document or the moving document; and
   a controller which is configured to:
      detect edges of a part of the stationary document positioned at the opening in the document cover based on image data read by the image pickup device when an image reading operation is performed by the stationary document scanning device; and
      perform an image data defining operation to determine image data, which is included within the detected edges of the stationary document, as exact image data read by the stationary document scanning device when the image reading operation is performed by the stationary document scanning device.

2. The image reader according to claim 1, further comprising a storage device which is configured to store at least one of image data read by the image pickup device from a portion of the document cover facing the scan window, and image data corresponding to the image data read by the image pickup device from the portion of the document cover facing the scan window,
   wherein the controller is further configured to detect the edges of the stationary document by comparing the image data stored in the storage device with image data read from the stationary document by the image pickup device.

3. The image reader according to claim 2, wherein the controller stores the at least one of the image data in the storage device when power of the image reader is turned on.

4. The image reader according to claim 1, wherein the controller detects the edges of the stationary document based on a contrast variation within the image data read by the image pickup device.

5. The image reader according to claim 1, wherein the document cover is movable between a first position in which the document cover covers the scan window and a second position in which a document cover uncovers the scan window such that a document may be placed on the scan window, and
   the image reader further comprises a position detector which is configured to determine whether the document cover is located at the first position,
   wherein the controller performs the image data defining operation only if the position detector determines that the document cover is located at the first position.

6. The image reader according to claim 1, wherein the portion of the document cover facing the scan window comprises a dark area at least a portion of which corresponds to an edge of the scan window.

7. The image reader according to claim 1, further comprising an output tray which is disposed on an opposite side of the document cover from the scan window, the output tray configured to accommodate a document which has been fed from the document feeding mechanism and scanned by the image pickup device at the scan window,
   wherein the document cover comprises a guide member configured to guide a document from the opening toward the output tray.

8. The image reader according to claim 7, wherein the guide member comprises a translucent member.

9. An image forming apparatus comprising:
   an image reader and an image forming unit disposed below the image reader,
   the image reader comprising:
   a stationary document scanning device which is configured to scan a stationary document;
   a moving document scanning device which is configured to scan a moving document;
   a scan window which is configured to support the stationary document;
   a document cover which is configured to be displaced with respect to the scan window and to cover the scan window, the document cover comprising an opening located at a position facing the scan window when the document cover covers the scan window;
   a document feeding mechanism which is disposed at the document cover and is configured to feed the moving document through the opening and onto the scan window when the moving document is to be scanned by the moving document scanning device;

an image pickup device which is disposed on an opposite side of the scan window from the document cover and is configured to read an image from the stationary document or the moving document; and a controller configured to:

detect edges of a part of the stationary document positioned at the opening in the document cover based on image data read by the image pickup device when an image reading operation is performed by the stationary document scanning device; and perform an image data defining operation to determine image data, which is included within the detected edges of the stationary document, as exact image data read by the stationary document scanning device when the image reading operation is performed by the stationary document scanning device.

\* \* \* \* \*